US008038089B2

(12) United States Patent
Shiga

(10) Patent No.: US 8,038,089 B2
(45) Date of Patent: Oct. 18, 2011

(54) LEADER MEMBER IN RECORDING TAPE CARTRIDGE, MANUFACTURING METHOD THEREOF, AND RECORDING TAPE CARTRIDGE

(75) Inventor: Hideaki Shiga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/754,669

(22) Filed: Apr. 6, 2010

(65) Prior Publication Data

US 2010/0258667 A1    Oct. 14, 2010

(30) Foreign Application Priority Data

Apr. 13, 2009 (JP) .................................. 2009-096781

(51) Int. Cl.
  *G11B 15/66*    (2006.01)
(52) U.S. Cl. .................................. 242/332.4
(58) Field of Classification Search .................. 242/348, 242/348.2, 338, 332, 332.4, 332.2, 532, 532.5; 360/132, 133
  See application file for complete search history.

(56) References Cited

U.S. PATENT DOCUMENTS

| | | | | |
|---|---|---|---|---|
| 6,050,514 A * | 4/2000 | Mansbridge | ............... | 242/332.7 |
| 6,331,922 B2 * | 12/2001 | Morita et al. | ................. | 360/132 |
| 6,622,365 B2 * | 9/2003 | North et al. | ..................... | 29/434 |
| 6,629,656 B2 * | 10/2003 | Morita et al. | ............... | 242/332.4 |
| 6,796,520 B2 * | 9/2004 | Ishihara et al. | ............ | 242/348.2 |
| 6,926,219 B2 * | 8/2005 | Imai | ........................... | 242/332.4 |
| 6,991,193 B2 * | 1/2006 | Kurokawa et al. | ......... | 242/332.4 |
| 7,121,494 B2 * | 10/2006 | Shiga et al. | ................. | 242/348.2 |
| 7,284,724 B2 * | 10/2007 | Ishihara et al. | ............ | 242/348.2 |
| 7,690,594 B2 * | 4/2010 | Takenoshita et al. | ...... | 242/332.4 |
| 2002/0109027 A1 * | 8/2002 | Ishihara et al. | ............... | 242/348 |
| 2002/0109028 A1 | 8/2002 | Ishihara et al. | | |
| 2003/0122016 A1 * | 7/2003 | Imai | ........................... | 242/348.2 |
| 2003/0168542 A1 * | 9/2003 | Kurokawa et al. | ......... | 242/332.4 |
| 2003/0183716 A1 * | 10/2003 | Hiraguchi | .................. | 242/348.2 |
| 2003/0189119 A1 * | 10/2003 | Morita et al. | .............. | 242/332.4 |
| 2004/0169103 A1 | 9/2004 | Ishihara et al. | | |
| 2004/0206841 A1 * | 10/2004 | Morita et al. | .............. | 242/348.2 |
| 2004/0206842 A1 * | 10/2004 | Morita et al. | .............. | 242/348.2 |
| 2005/0139709 A1 * | 6/2005 | Shiga et al. | ................ | 242/348.2 |
| 2006/0186246 A1 * | 8/2006 | Hiraguchi | .................. | 242/348.2 |

FOREIGN PATENT DOCUMENTS

JP    3952101 B2    8/2007

* cited by examiner

*Primary Examiner* — William A Rivera
(74) *Attorney, Agent, or Firm* — SOLARIS Intellectual Property Group, PLLC

(57) ABSTRACT

The present invention provides a leader member in a recording tape cartridge that is excellent in terms of strength, rigidity, corrosion resistance, a low frictional property, and abrasion resistance, have excellent productivity, and is manufactured with a low cost, a manufacturing method thereof, and the recording tape cartridge. A leader member that is attached to a free end of a recording tape wound around a single reel accommodated in a case and that is pulled out from an opening formed in the case by an pull out member of a drive device is manufactured by die casting with one of a zinc alloy, an aluminum alloy, a magnesium alloy, or a copper alloy.

8 Claims, 9 Drawing Sheets

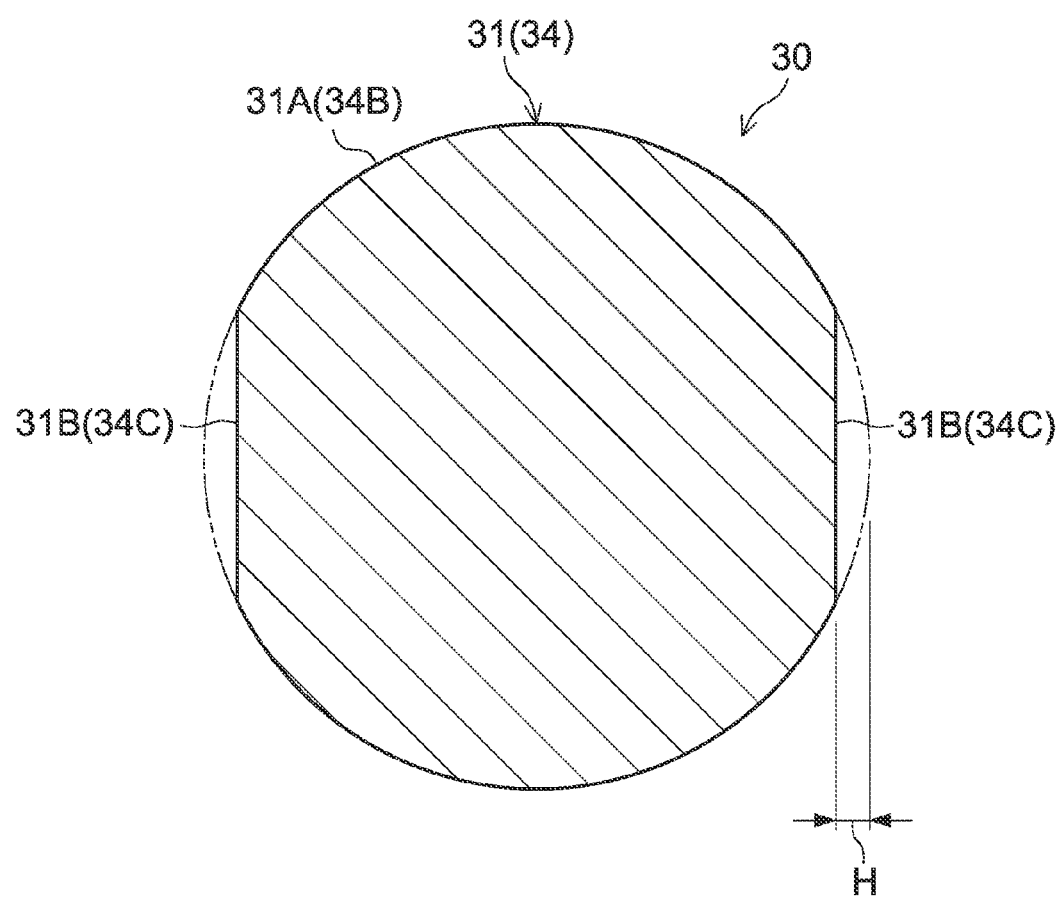

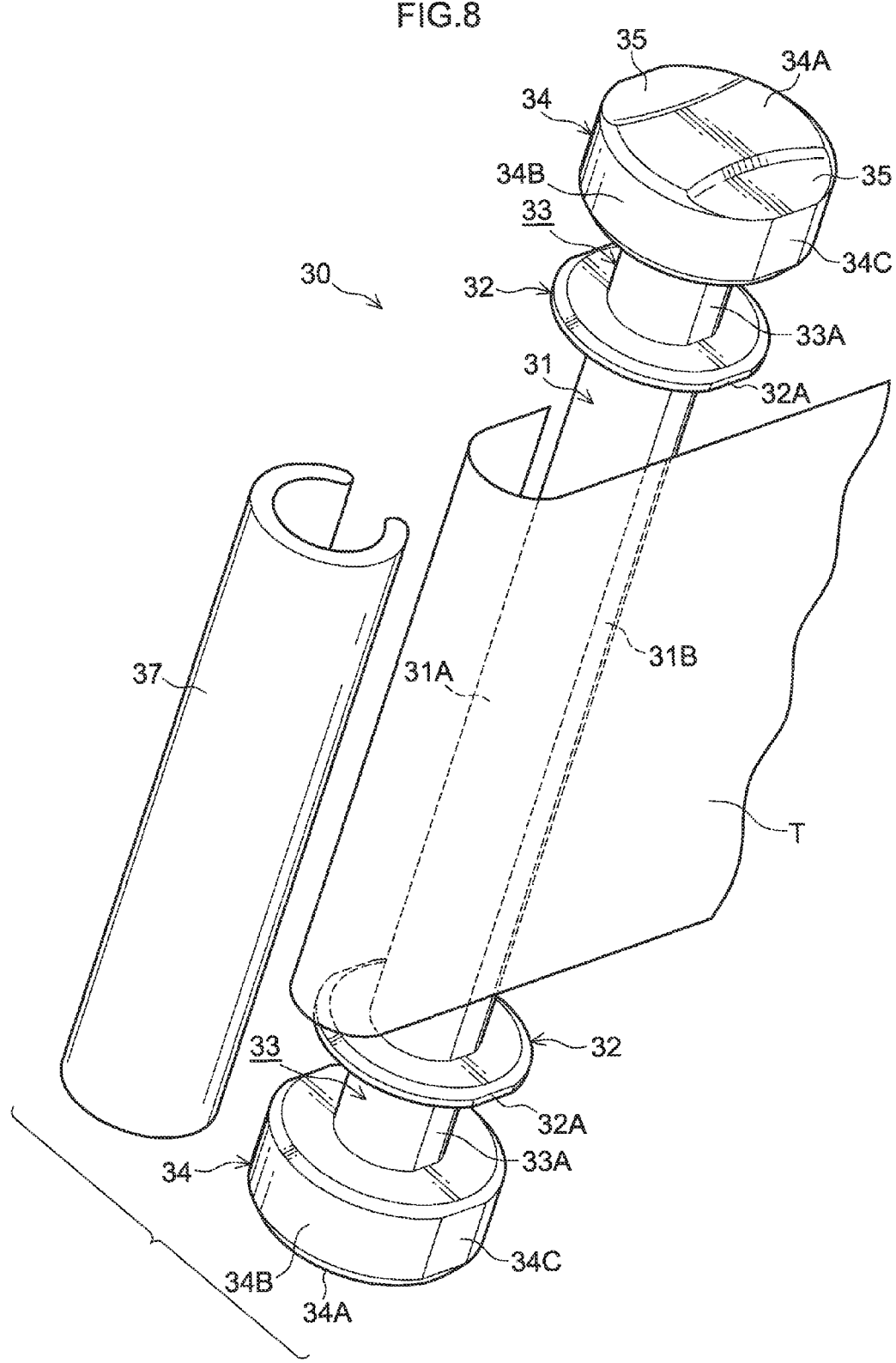

LEADER MEMBER IN RECORDING TAPE CARTRIDGE, MANUFACTURING METHOD THEREOF, AND RECORDING TAPE CARTRIDGE

CROSS-REFERENCE TO RELATED APPLICATION

This application claims priority under 35 USC 119 from Japanese Patent Application No. 2009-096781 filed Apr. 13, 2009, the disclosure of which is incorporated by reference herein.

BACKGROUND OF THE INVENTION

1. Technical Field

The present invention relates to a recording tape cartridge that accommodates a single reel on which a recording tape, such as a magnetic tape, which is mainly used as a record and reproduction medium of a computer, is wound, a leader member that is configured such that the recording tape is pulled out by a pulling out member of a drive device, and a manufacturing method of the leader member.

2. Related Art

Conventionally, a recording tape cartridge where a recording tape, such as a magnetic tape, which is used as a data record and reproduction medium of a computer (data backup), is wound around a reel and the single reel is mounted in a case has been known. A free end of the recording tape is mounted with a leader member for which a pull out member of a drive device is engaged and pulls out.

As the leader member, a leader pin that is configured to have an approximately array shape is known, and this leader pin is manufactured using plastic (including fiber-reinforced plastic based on such as carbon fiber) or stainless steel (for example, refer to Japanese Patent No. 3952101).

The leader pin that is manufactured with stainless steel is excellent in terms of the strength, the rigidity, the corrosion resistance, the low frictional property, and the abrasion resistance. However, a manufacturing method of such leader pin is mainly implemented by cutting, and it may take about 20 to 60 sec. to process each one leader pin. For this reason, productivity may not be high and a manufacturing cost may be increased.

Since a leader pin that is manufactured with plastic (including fiber-reinforced plastic based on such as carbon fiber) has light weight and may be manufactured by injection molding (processing of one shot is enabled for about 10 to 20 sec.), so productivity is high. However, as compared with metal, the strength and rigidity of the plastic may be deteriorated. Although depending on a type of the plastic or a counterpart material, the low frictional property and the abrasion resistance of the plastic may be deteriorated as compared with the metal.

SUMMARY OF THE INVENTION

Accordingly, the present invention has been made in view of the above-described circumferences and the invention provides a leader member in a recording tape cartridge that may be excellent in terms of strength, rigidity, corrosion resistance, a low frictional property, and abrasion resistance, have excellent productivity, and be manufactured with a low cost, a manufacturing method thereof, and a recording tape cartridge.

A leader member in a recording tape cartridge according to a first aspect of the invention is attached to a free end of a recording tape wound around a single reel accommodated in a case, and that is pulled out from an opening formed in the case by a pull out member of a drive device, and the leader member is manufactured by die casting with one of a zinc alloy, an aluminum alloy, a magnesium alloy, or a copper alloy.

According to the first aspect, as compared with a leader member that is made of plastic (including fiber-reinforced plastic based on such as carbon fiber), the leader member is excellent in terms of the strength, the rigidity, the low frictional property, and the abrasion resistance. In addition, as compared with a leader member that is made of stainless steel, the leader member that has excellent productivity and is relatively excellent in terms of the corrosion resistance is obtained with a low cost.

According to a leader member in a recording tape cartridge according to a second aspect of the invention, in the leader member in the recording tape cartridge according to the first aspect, the leader member is a leader pin, and a dimension of a portion corresponding to a parting line in an axial direction of the leader pin is reduced.

By the dimension reduction, a distance from an axis center of the leader pin to an outer circumferential surface of the leader pin at the portion corresponding to the parting line is shorter than a distance from the axis center of the leader pin to an outer circumferential surface of the leader pin at a portion other than the portion corresponding to the parting line.

According to the second aspect, when the recording tape is fixed to the leader pin, the recording tape can be prevented from being cut by a burr or the like formed in the parting line.

Further, it is possible that a substantially planar portion is formed in the leader pin by the dimension reduction.

According to a leader member in a recording tape cartridge according to a third aspect of the invention, in the leader member in the recording tape cartridge according to the first aspect, the leader member is a leader pin having a body on which the free end of the recording tape is wound, and a dimension of at least a portion corresponding to a parting line in an axial direction of the body is reduced.

According to the third aspect, when the recording tape is fixed to the leader pin, the recording tape can be prevented from being cut by a burr or the like formed in the parting line.

According to a leader member in a recording tape cartridge according to a fourth aspect of the invention, in the leader member in the recording tape cartridge according to any one of the first to third aspects, the leader member is a leader pin that has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

According to the fourth aspect, when the leader pin is held in the case, hindrance of holding by the gate mark can be prevented.

Further, it is possible that the leader member is a leader pin that has head portions on both ends thereof, and a notch portion is formed in the head portion, the notch portion being configured such that a mark of a pushed portion which is to be pushed by a pushing member, the mark being formed at the head portion when the leader pin is manufactured, does not protrude further than a top surface of the head portion.

According to a leader member in a recording tape cartridge according to a fifth aspect of the invention, in the leader member in the recording tape cartridge according to any one of the first to fourth aspects, a surface of the leader member is subjected to nickel plating working or hard chrome plating working.

According to the fifth aspect of the invention, the leader member that is further excellent in terms of the low frictional property and the abrasion resistance is obtained.

According to a leader member in a recording tape cartridge according to a sixth aspect of the invention, in the leader member in the recording tape cartridge according to any one of the first to fourth aspects, a surface of the leader member is subjected to one of nickel plating working, chrome plating working or chromate treatment.

According to the sixth aspect of the invention, the leader member that is further excellent in terms of the corrosion resistance is obtained.

A recording tape cartridge according to a seventh aspect of the invention includes a single reel around which a recording tape where the leader member of any one of the first to sixth aspects is attached to the free end is wound; and a case that rotatably accommodates the reel.

According to the seventh aspect of the invention, as compared with a leader member that is made of plastic (including fiber-reinforced plastic based on such as carbon fiber), the leader member is excellent in terms of the strength, the rigidity, the low frictional property, and the abrasion resistance. In addition, as compared with a leader member that is made of stainless steel, the leader member that has excellent productivity and is relatively excellent in terms of the corrosion resistance is obtained with a low cost. Accordingly, a manufacturing cost of the recording tape cartridge is reduced.

In a method of manufacturing a leader member in a recording tape cartridge according to an eighth aspect of the invention, the leader member is attached to a free end of a recording tape wound around a single reel accommodated in a case, and that is pulled out from an opening formed in the case by a pull out member of a drive device, the method comprises die casting with one of a zinc alloy, an aluminum alloy, a magnesium alloy, or a copper alloy to form the leader member.

According to the eighth aspect of the invention, as compared with a leader member that is made of plastic (including fiber-reinforced plastic based on such as carbon fiber), the leader member is excellent in terms of the strength, the rigidity, the low frictional property, and the abrasion resistance. In addition, as compared with a leader member that is made of stainless steel, the leader member that has excellent productivity and is relatively excellent in terms of the corrosion resistance is manufactured with a low cost.

According to a method of manufacturing a leader member in a recording tape cartridge according to a ninth aspect of the invention, in the method of manufacturing a leader member in a recording tape cartridge according to the eighth aspect, the leader member is a leader pin, and a dimension of a portion corresponding to a parting line in an axial direction of the leader pin is reduced.

By the dimension reduction, a distance from an axis center of the leader pin to an outer circumferential surface of the leader pin at the portion corresponding to the parting line is shorter than a distance from the axis center of the leader pin to an outer circumferential surface of the leader pin at a portion other than the portion corresponding to the parting line.

According to the ninth aspect of the invention, when the recording tape is fixed to the leader pin, the recording tape can be prevented from being cut by a burr or the like formed in the parting line.

According to a method of manufacturing a leader member in a recording tape cartridge according to a tenth aspect of the invention, in the method of manufacturing a leader member in a recording tape cartridge according to the eighth aspect, the leader member is a leader pin having a body on which the free end of the recording tape is wound, and a dimension of at least a portion corresponding to a parting line in an axial direction of the body is reduced.

According to the tenth aspect of the invention, when the recording tape is fixed to the leader pin, the recording tape can be prevented from being cut by a burr or the like formed in the parting line.

According to a method of manufacturing a leader member in a recording tape cartridge according to an eleventh aspect of the invention, in the method of manufacturing a leader member in a recording tape cartridge according to any one of the eighth to tenth aspects, the leader member is a leader pin that has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

According to the eleventh aspect, when the leader pin is held in the case, hindrance of holding by the gate mark can be prevented.

According to a method of manufacturing a leader member in a recording tape cartridge according to a twelfth aspect of the invention, in the method of manufacturing a leader member in a recording tape cartridge according to any one of the eighth to eleventh aspects, the method further comprises subjecting a surface of the leader member to nickel plating working or hard chrome plating working.

According to the twelfth aspect of the invention, the leader member that is further excellent in terms of the low frictional property and the abrasion resistance is manufactured.

According to a method of manufacturing a leader member in a recording tape cartridge according to a thirteenth aspect of the invention, in the method of manufacturing a leader member in a recording tape cartridge according to any one of the eighth to eleventh aspects, the method further comprises subjecting a surface of the leader member to one of nickel plating working, chrome plating working or chromate treatment.

According to the thirteenth aspect of the invention, the leader member that is further excellent in terms of the corrosion resistance is manufactured.

As such, according to the invention, the leader member in the recording tape cartridge that can be excellent in terms of strength, rigidity, corrosion resistance, a low frictional property, and abrasion resistance, have excellent productivity, and be manufactured with a low cost, the manufacturing method thereof, and the recording tape cartridge is provided.

BRIEF DESCRIPTION OF THE DRAWINGS

Embodiments of the present invention will be described in detail with reference to the following figures, wherein:

FIG. 7 is a schematic cross-sectional view illustrating the leader pin after the thickness of a portion corresponding to a parting line is reduced;

FIG. 8 is a schematic exploded perspective view illustrating the leader pin before a recording tape is mounted by a tape locking member;

DETAILED DESCRIPTION OF THE INVENTION

Hereinafter, an exemplary embodiment according to the present invention will be described in detail based on the accompanying drawings. For convenience of explanation, in FIG. 1, a loading direction of a recording tape cartridge 10 to a drive device is illustrated by an arrow FR and the loading direction is assumed as a forward direction (a front side) of the recording tape cartridge 10. A direction of an arrow RI that is orthogonal to the arrow FR is assumed as a rightward direction (a right side). A direction that is orthogonal to the direction of the arrow FR and the direction of the arrow RI is illustrated by an arrow UP and this direction is assumed as an upward direction (an upper side) of the recording tape cartridge 10. First, the recording tape cartridge 10 will be simply described.

Figure 1:
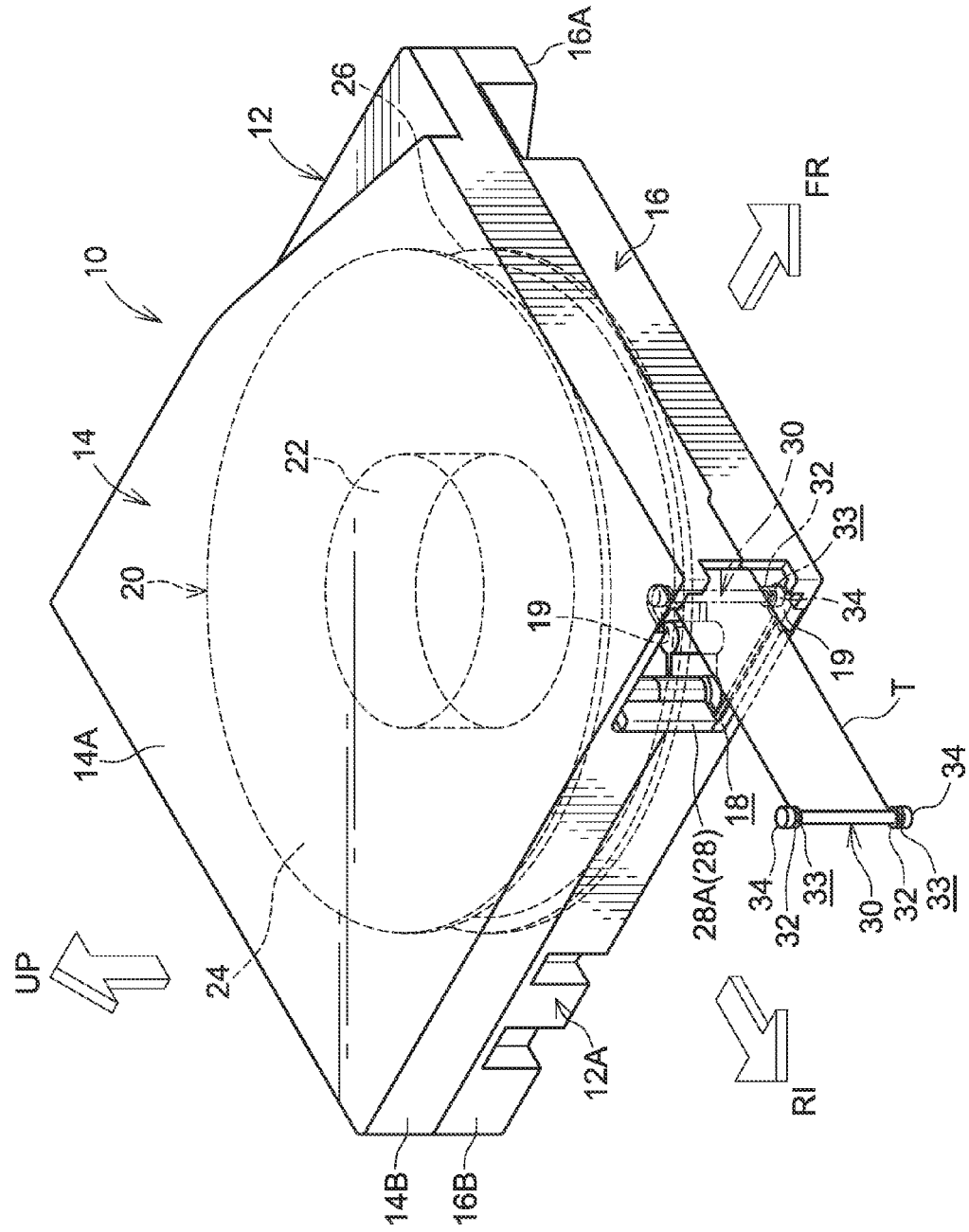
FIG. 1 is a schematic perspective view illustrating a recording tape cartridge including a leader pin.

As illustrated in FIG. 1, the recording tape cartridge 10 has a box-like case 12 that has an approximately rectangular shape. The case 12 is configured such that an upper case 14 and a lower case 16 made of a resin are bonded by a machine screw or the like in a state where the upper case 14 and the lower case 16 cause a peripheral wall 14B erected on an edge of a ceiling (top) plate 14A and a peripheral wall 16B erected on an edge of a bottom plate 16A to abut each other. In the case 12, only a single reel 20 made of a resin is rotatably accommodated.

The reel 20 includes a reel hub 22 that constitutes an axis center portion and is shaped as a cylindrical tube having a bottom, a lower flange 26 that is provided on a lower end of the reel hub 22, and an upper flange 24 that is provided on an upper end of the reel hub 22. A recording tape T, such as a magnetic tape, which functions as an information record and reproduction medium, is wound around an outer circumferential surface of the reel hub 22, and ends of the wound recording tape T in a width direction are held by the upper flange 24 and the lower flange 26.

On a lower surface of a bottom wall of the reel hub 22, a reel gear (not illustrated) is formed in a circular shape. In an approximately central portion of the lower case 16, a gear opening (not illustrated) from which exposes the reel gear to the outside is provided. The reel gear that is exposed from the gear opening is meshed with a driving gear (not illustrated) that is formed at a rotation shaft of a drive device (not illustrated) and is rotated, and the reel 20 is relatively rotatable with respect to the case 12.

On a right wall 12A of the case 12, an opening 18 that is used to pull out the recording tape T wound around the reel 20 is formed. To a free end of the recording tape T that is pulled out from the opening 18, a leader pin 30 that is pulled out by an pull out member (not illustrated) of the drive device while being caught (engaged) is fixed.

Figure 2:
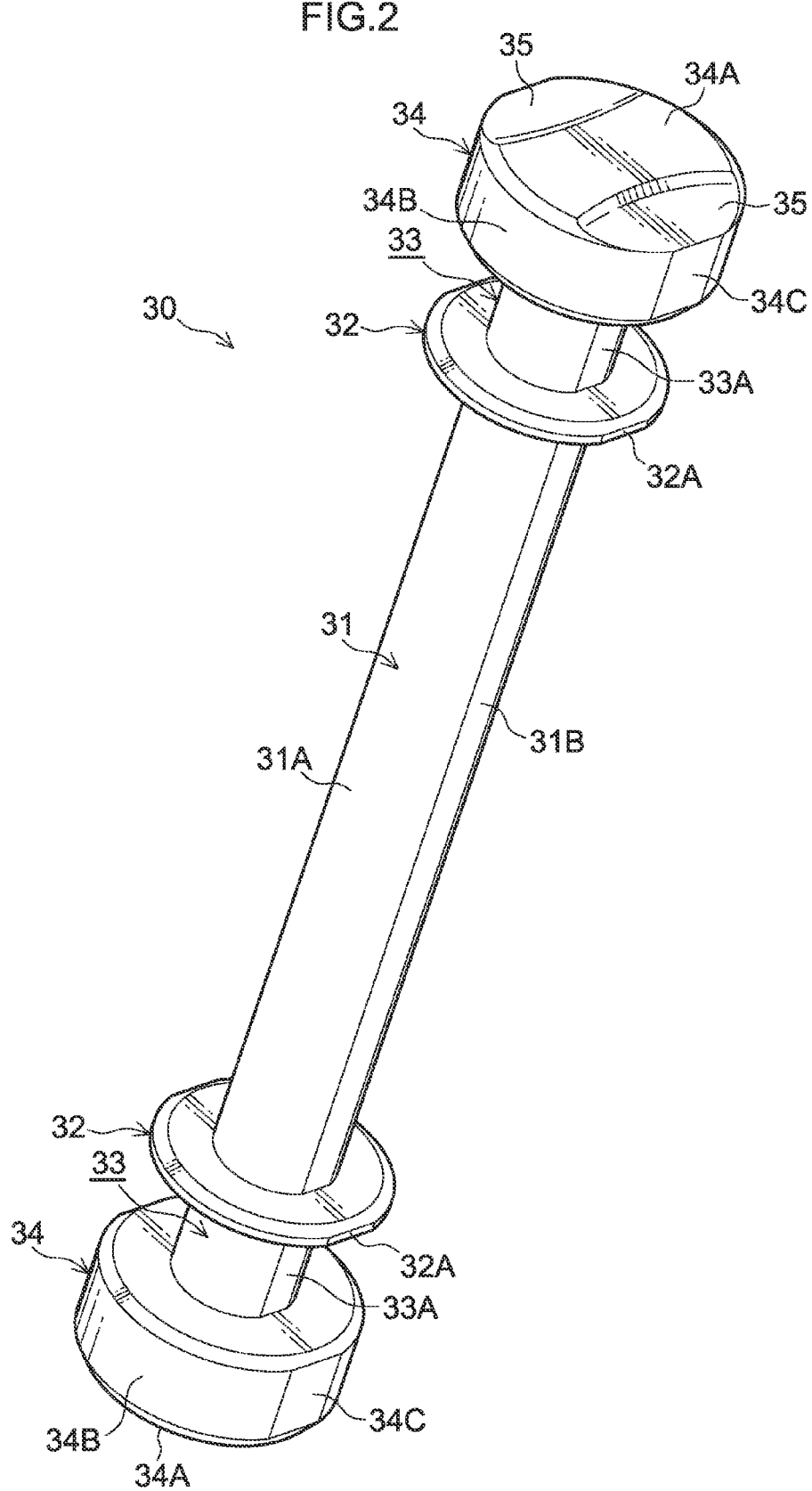
FIG. 2 is a schematic perspective view illustrating the leader pin.

As illustrated in detail in FIG. 2, in the leader pin 30, head portions 34 that have a thick plate shape are integrally provided on both ends in an axial direction of a body 31 having a cylindrical shape. At predetermined positions of the body 31 at the inside of the axial direction of the head portions 34, flange portions 32 that have a thin plate shape are integrally provided at a predetermined distance.

The free end of the recording tape T is fixed to the body 31 between the flange portions 32, and each space between the flange portion 32 and the head portion 34 is configured to be a ring groove 33 where a hook of the pull out member of the drive device is caught.

As illustrated in FIG. 1, on the inner side of the opening 18 of the case 12, that is, on an inner surface of the ceiling plate 14A of the upper case 14 and on an inner surface of the bottom plate 16A of the lower case 16, a pair of upper and lower pin holding portions 19 that position and hold the leader pin 30 within the case 12 are provided.

The pin holding portion 19 has an approximately semicircular shape in which the pull out side of the recording tape T is opened, and the head portion 34 of the leader pin 30 which is in an erected state can enter in or exit from the pin holding portion 19 from the opening side thereof. An outer surface 34A (refer to FIG. 2) that contacts the pin holding portion 19 of the head portion 34 is formed in an approximately spherical surface shape.

In the vicinity of the pin holding portion 19, a plate spring (not illustrated) is fixedly disposed. In the plate spring, a fork shaped tip end of the plate spring is each engaged with a peripheral surface 34B (refer to FIG. 2B) of the head portion 34 of the leader pin 30 and the leader pin 30 is held by the pin holding portion 19. When the leader pin 30 enters in or exits from the pin holding portion 19, the tip end of the plate spring is appropriately elastically deformed and allows the movement of the leader pin 30.

The opening 18 is opened or closed by a door 28. The door 28 is formed in an approximately rectangular plate shape with a size that enables closing of the opening 18, and is biased by a biasing member (not illustrated) in a direction toward which the opening 18 is closed. On a front end of the door 28, a convex portion 28A for an opening and closing operation protrudes outward. The convex portion 28A is engaged with an opening/closing member (not illustrated) of the drive device according to loading of the recording tape cartridge 10 to the drive device. As a result, the door 28 is opened against the biasing force of the biasing member.

Figure 3:
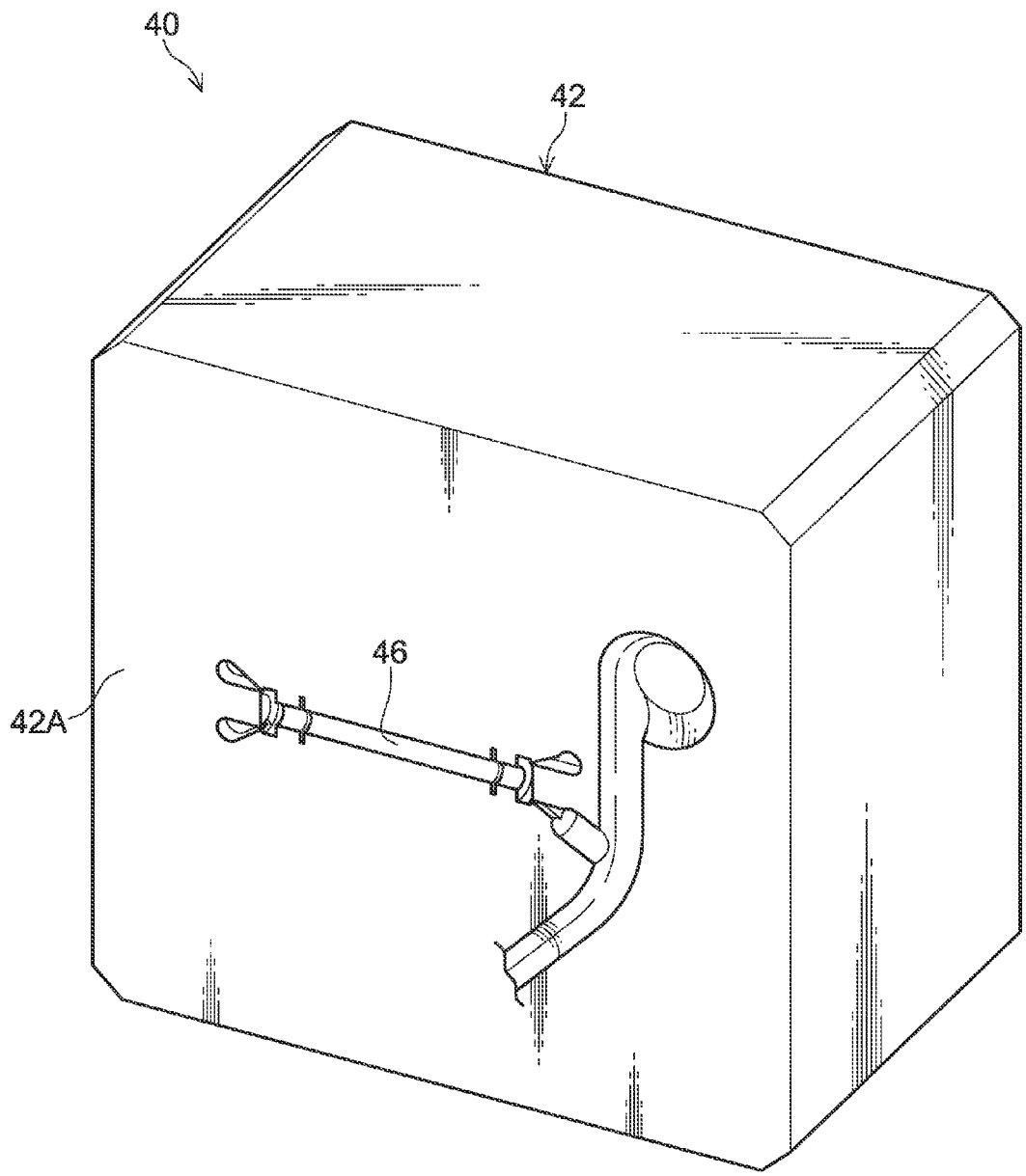
FIG. 3 is a schematic perspective view illustrating a fixed-side mold for manufacturing the leader pin.
Figure 4:
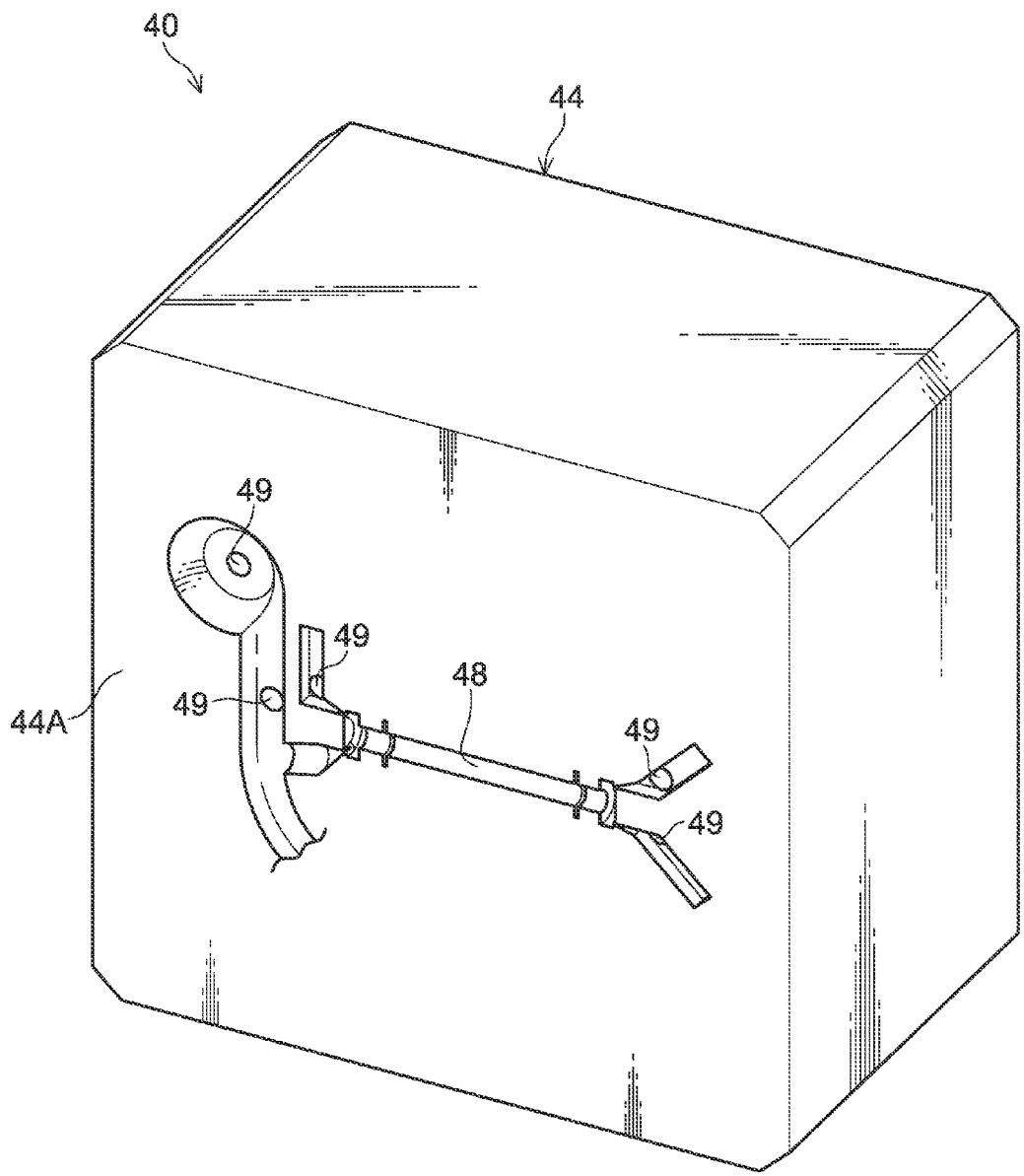
FIG. 4 is a schematic perspective view illustrating a movable-side mold for manufacturing the leader pin.
Figure 5:
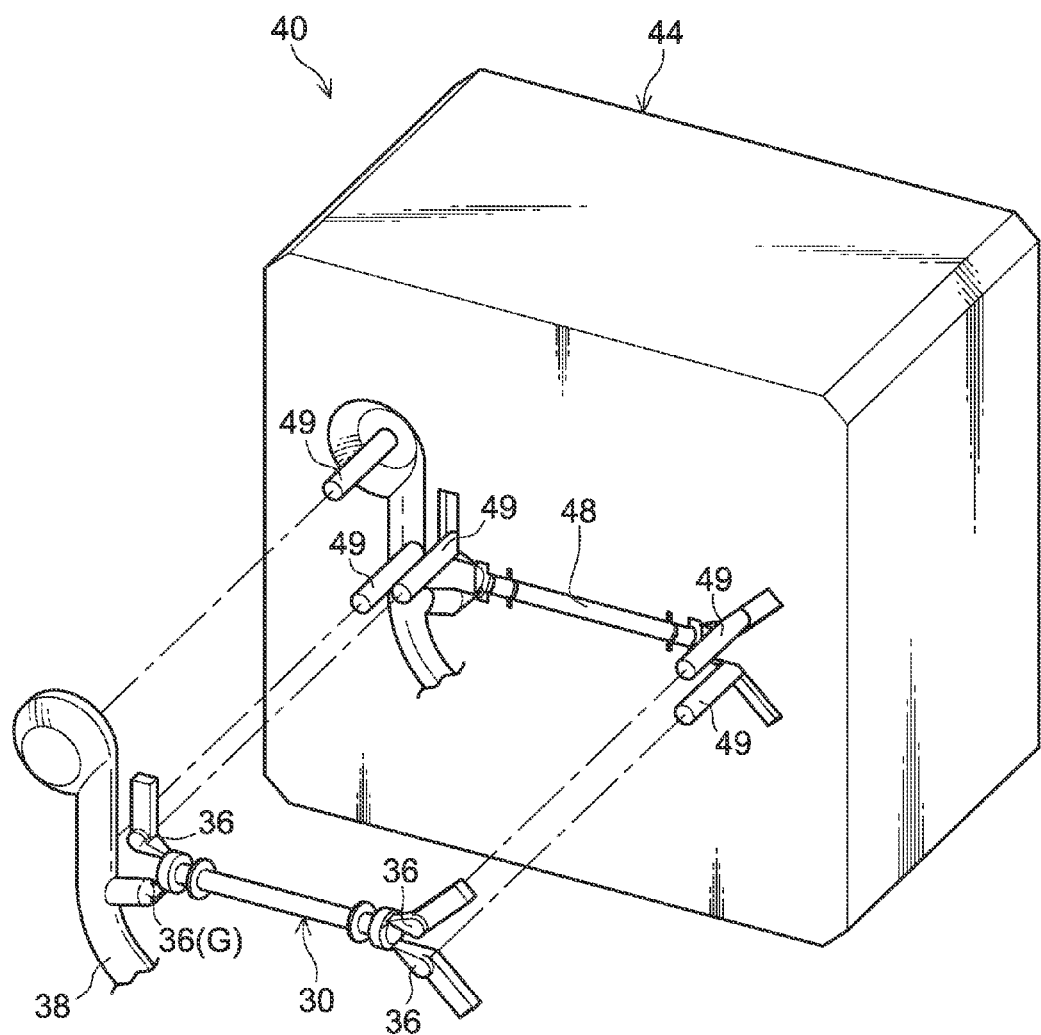
FIG. 5 is a schematic perspective view illustrating the leader pin immediately after being extruded from the movable-side mold.

Next, a leader pin 30 that is an example of the leader member according to the exemplary embodiment in the recording tape cartridge 10 that has the above-descried configuration will be described in detail. As illustrated in FIGS. 3 to 5, the leader pin 30 is manufactured by die-casting of metal alloy. That is, the leader pin 30 is manufactured by a mold 40 illustrated in FIGS. 3 and 4 with a metal alloy of any one of a zinc alloy, an aluminum alloy, a magnesium alloy, and a copper alloy as a material.

The mold 40 that is a metallic mold is configured by a core 42 which is to be the fixed side illustrated in FIG. 3 and a cavity 44 which is to be the movable side illustrated in FIG. 4, and the cavity 44 moves to come close to or be away from the core 42 by a moving mechanism (not illustrated). In matching surfaces 42A and 44A of the core 42 and the cavity 44, concave portions 46 and 48 for forming the leader pin 30 are formed, respectively.

Accordingly, when the leader pin 30 of zinc alloy is manufactured, the matching surface 44A of the cavity 44 is matched with the matching surface 42A of the core 42 to be mold clamped, and a fused zinc alloy is press fitted into the concave portions 46 and 48. After the shape of the leader pin 30 is formed, the cavity 44 is separated from the core 42.

As a result, the leader pin 30 (including overflow portions 36 and a runner 38 which will be described in detail below) is taken out from the core 42 in a state where the leader pin 30 is fixed to the cavity 44 side. Then, as illustrated in FIG. 5, the leader pin 30 is pushed out (extruded or ejected out) by plural extrusion (pushing) pins 49 provided in the cavity 44 and is pulled out from the cavity 44. The overflow portions 36 and the runner 38 which will be described in detail below are removed. After predetermined processings (plating and the like) are performed. As a result, the leader pin 30 is manufactured as a product illustrated in FIG. 2.

In this case, when the leader pin 30 (including the overflow portions 36 and the runner 38 which will be described in detail below) is taken out from the cavity 44, extruded (ejected out) portions by the extrusion pins 49 are set to be the overflow portions (portions to be extruded (ejected)) 36 that are integrally connected to the head portions 34 of the leader pin 30, such that the shape of the leader pin 30 as the product is not deformed and damaged by the extrusion pin 49 (such that an ejected mark (trace) such as a step is not formed at the leader pin 30 as the product, by pressing it by the extrusion pin 49).

Figure 6:
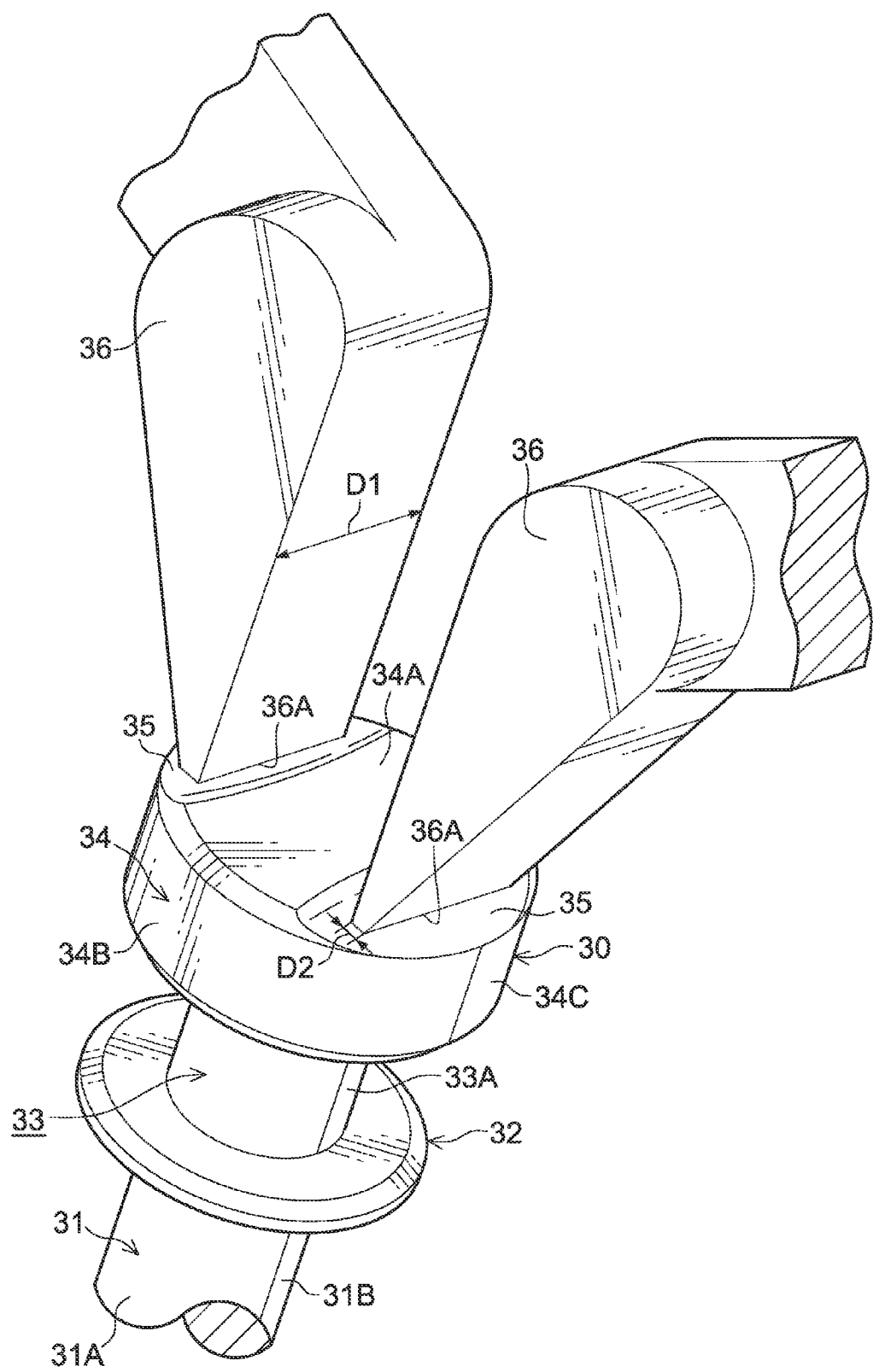
FIG. 6 is a schematic enlarged perspective view of a head portion of the leader pin extruded from the mold.

That is, when the leader pin 30 is manufactured by the die-casting of metal alloy, as illustrated in FIG. 6, the overflow portions 36 having a predetermined size are preferably formed in the vicinity of a peripheral edge portion (in the vicinity of a corner portion) in the outer surface 34A of the head portion 34 so as to be joined symmetrical to the left and right sides two by two (that is, two overflow portions 36 are formed at one of the head portions 34 and the other two overflow portions 36 are formed at the other of the head portions 34). One overflow portion 36 (which becomes a gate G) is joined to the runner 38 (refer to FIG. 5) which is formed by a path for press fitting the fused zinc alloy.

As illustrated in FIG. 6, each overflow portion 36 is formed such that the thickness D1 of the overflow portion in a direction extruded by the extrusion pin 49 becomes relatively thick, and rigidity of the overflow portion 36 when being extruded by the extrusion pin 49 is secured. That is, each overflow portion 36 has strength against the force applied in the direction extruded by the extrusion pin 49, and is formed in a shape (thickness) in which sufficient resistance can be secured against the pressing force when being extruded by the extrusion pin 49.

When viewed from the direction extruded by the extrusion pin 49, in each overflow portion 36, the side of a join portion 36A that is joined to the outer surface 34A of the head portion 34 is formed in an approximately wedge shape which is acute angled, and the thickness D2 of the join portion 36A in a direction orthogonal to the direction extruded by the extrusion pin 49 is greatly thin.

Thereby, each overflow portion 36 can be easily removed (cut) from the outer surface 34A of the head portion 34. That is, the join portion 36A in each overflow portion 36 has a shape that is vulnerable against the force applied from the direction orthogonal to the direction extruded by the extrusion pin 49, and that is easily cut (removed) by the force applied from the direction.

In the outer surface 34A of the head portion 34 of the leader pin 30, in a portion of the peripheral edge portion (including an angular portion) that includes a portion where the join portion 36A of each overflow portion 36 is joined, a notch (recess) portion 35 where the thickness of the head portion 34 is reduced is formed with a predetermined size (depth). That is, the join portion 36A of each overflow portion 36 is joined to each notch portion 35.

Thereby, a mark (including the mark of the gate G) that is generated (formed) by (when) removing (cutting) each overflow portion 36 does not protrude further than the outer (top) surface 34A of the head portion 34 of the leader pin 30. That is, when the leader pin 30 is held by the pin holding portions 19 of the case 12, the hindrance of the mark of the gate G can be prevented.

The notch portion 35 is formed in a case where at least the overflow portion 36 (including the gate G) is joined, in the head portion 34 of the leader pin 30. That is, the notch portion 35 may not be formed in a case where the overflow portion 36 is not joined, in the head portion 34 of the leader pin 30.

Figure 9A:
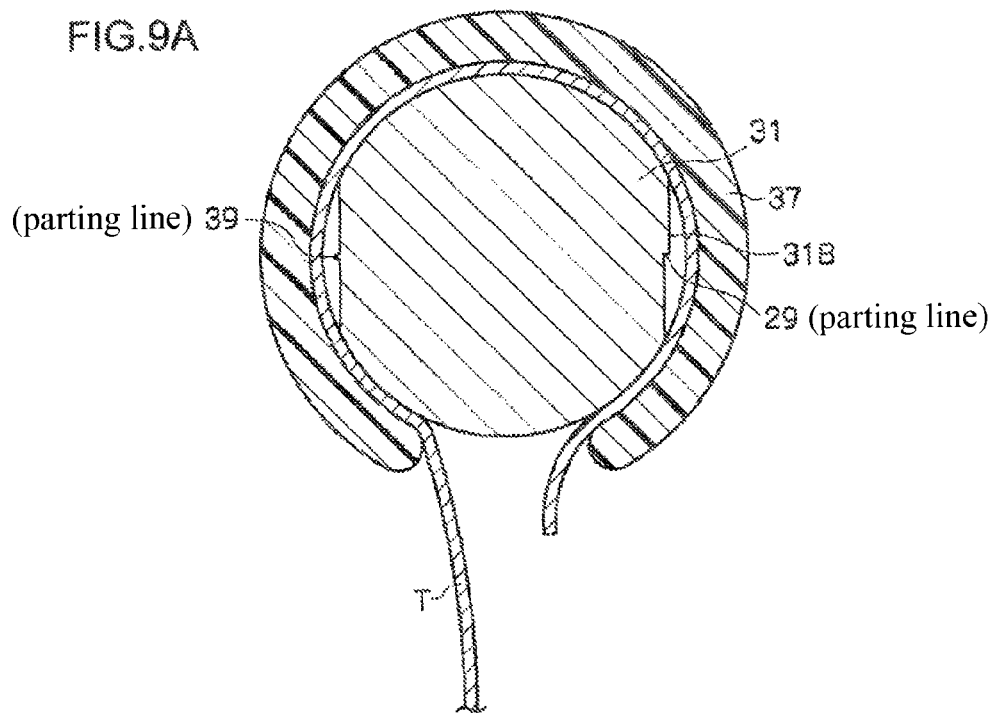
FIG. 9A is a schematic cross-sectional view illustrating a leader pin according to an exemplary embodiment after the recording tape is mounted by the tape locking member.

On the surface (a peripheral surface 31A of the body 31, a peripheral surface 34B of the head portion 34 and the like) of the leader pin 30 formed in the above way, a parting line (not illustrated) is formed (positioned) along the axial direction. In the parting line, as illustrated in FIGS. 9A and 9B, a burr 39 is formed, and/or a step edge 29 is formed when mold clamping is performed in a state where processing dimension difference of the core 42 and the cavity 44 occurs or in a state where the core 42 and the cavity 44 are relatively shifted (miss-alignment occurs).

As illustrated in FIGS. 2 and 7, in the leader pin 30, the dimension (thickness) of a portion that corresponds to the parting line is slightly reduced. That is, in the leader pin 30, at least a portion corresponding to the parting line in the body 31 between the flange portions 32 where the recording tape T is fixed, is dimensionally reduced by the predetermined amount H in a direction orthogonal to the axial direction (H=0.005 mm to 0.04 mm, preferably, 0.01 mm to 0.03 mm) so as to be flat along the axial direction, so that a planar portion 31B is formed at the portion.

In this case, as illustrated in FIGS. 8 to 9A and 9B, the free end of the recording tape T is wound around the body 31 of the leader pin 30, and is pressed and held by a resin clip 37 functioning as a tape catching (latching) member formed in a "C" shape in cross-section view from the outside by elastic force of the clip 37 to be caught (fixed).

Figure 9B:
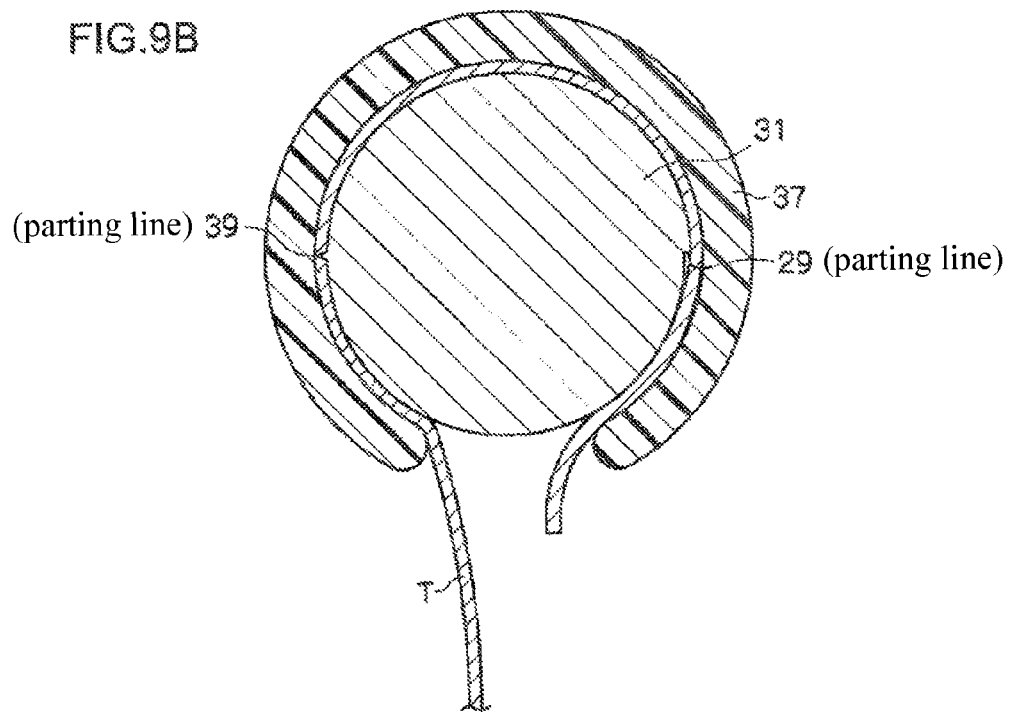
FIG. 9B is a schematic cross-sectional view illustrating a leader pin according to a comparative example after the recording tape is mounted by the tape locking member.

Accordingly, as illustrated in FIG. 9B, in the case of a leader pin according to a comparative example where the planar portion 31B of which the thickness is reduced is not formed on the portion corresponding to the parting line of the body 31, because the free end of the recording tape T is pressed and held by the clip 37, it may be damaged by the burr 39 and/or the step edge 29 formed in the parting line of the body 31 or may be cut.

However, as illustrated in FIG. 9A, in the case of the leader pin 30 according to the exemplary embodiment, the planar portion 31B of which the thickness is reduced is formed on the portion corresponding to the parting line of the body 31. Therefore, even though the free end of the recording tape T that is wound around the body 31 of the leader pin 30 is pressed and held by the clip 37, the free end of the recording tape T is prevented from being damaged by the burr 39 and/or the step edge 29 formed (remained) in the parting line of the planar portion 31B or being cut.

In the leader pin 30 illustrated in FIG. 2, portions corresponding to the parting line of the flange portion 32 and the cylindrical groove 33 are also dimensionally reduced, and planar portions 32A and 33A (a substantially planar portion) are formed on the corresponding portions, respectively. However, the planar portions 32A and 33A may not be formed in the corresponding portions. However, in a portion corresponding to the parting line of the peripheral surface 34B of the head portion 34 where the plate spring is engaged, a planar portion (a substantially planar portion) 34C of which the thickness is reduced is preferably formed.

According to this configuration, an engaging defect of the tip end of the plate spring that is engaged with the peripheral surface 34B of the head portion 34 of the leader pin 30 is suppressed or prevented, and generation of a variation in the inserting force and the separating force of the head portion 34 with respect to the pin holding portion 19 by an increase in the outer diameter (diameter of a direction orthogonal to the axial direction) of the portion corresponding to the parting line of the head portion 34 due to the burr 39 and/or the step edge 29 may be reduced.

Next, an operation and effect, other than the above mentioned operation and effect, of the leader pin 30 that has the above configurations will be described. As described above, the leader pin 30 is manufactured by a die casting manufacturing method (by the mold 40) with the metal alloy of any one of the zinc alloy, the aluminum alloy, the magnesium alloy, and the copper alloy as a material.

In this case, in the metal alloy, since thermal conductivity is higher than that of the plastic, and specific heat is lower than that of the plastic, processing of one shot is enabled for 2 to 10 sec. That is, in the case of the leader pin 30 that is manufactured by die-casting of the metal alloy, productivity is improved as compared with the case of a leader pin (not illustrated) that is manufactured by cutting stainless steel.

Since the leader pin 30 is manufactured with the metal alloy of any one of the zinc alloy, the aluminum alloy, the magnesium alloy, and the copper alloy as the material, the leader pin 30 may be manufactured with a low cost. Since the leader pin 30 is manufactured with metal, the leader pin 30 is relatively excellent in terms of the strength, the rigidity, the low frictional property, and the abrasion resistance as compared with a leader pin (not illustrated) that is manufactured using the plastic (including fiber-reinforced plastic based on such as carbon fiber). The leader pin 30 that is manufactured using the metal alloy is relatively excellent in terms of the corrosion resistance.

In particular, when the leader pin is manufactured with the copper alloy as the material, the leader pin is excellent in terms of the corrosion resistance, the low frictional property, and the abrasion resistance. When the leader pin is manufactured with the zinc alloy as the material, the leader pin is excellent in terms of dimension precision at the time of die-casting, durability of the mold 40, and recycling efficiency. When the leader pin is manufactured with the aluminum alloy or the magnesium alloy as the material, the leader pin is manufactured with lighter weight. Therefore, when the recording tape cartridge 10 is dropped and receives shocks, the inertial force that is applied to the leader pin 30 decreases, and it becomes difficult to separate the leader pin 30 from the pin holding portion 19.

The leader pin 30 according to the exemplary embodiment that is manufactured by the die-casting manufacturing method with the metal alloy of any one of the zinc alloy, the aluminum alloy, the magnesium alloy, and the copper alloy as the material is excellent in terms of balance of productivity and various characteristics, and the leader pin 30 is manufactured with a low cost. Accordingly, if the leader pin 30 of the exemplary embodiment is adopted, a manufacturing cost of the recording tape cartridge 10 can be reduced.

The surface of the leader pin 30 that is formed in the above way is preferably subjected to nickel plating processing (working) or hard chrome plating processing (working). Thereby, the low frictional property and the abrasion resistance of the leader pin 30 may be further improved. The surface of the leader pin 30 may be subjected to the nickel plating working or the chrome plating working or the chromate treatment. As a result, the corrosion resistance of the leader pin 30 can be further improved.

The leader member in the recording tape cartridge 10 and the manufacturing method thereof according to the exemplary embodiment are described based on the exemplary embodiment illustrated in the drawings, but are not limited thereto, and various modifications and changes may be made without departing from the scope of the invention.

For example, in the exemplary embodiment, the leader pin 30 that has the head portions 34 on both ends thereof is described as the example of the leader member, but the leader member according to the exemplary embodiment is not limited to the above example. That is, the invention may be applied to a leader pin (not illustrated) with no head portion that is mounted to a tip end of a leader tape (not illustrated) fixed to the free end of the recording tape T or a leader member (not illustrated) that is called a "buckle" adopted in SDLT.

What is claimed is:

1. A leader member in a recording tape cartridge, that is attached to a free end of a recording tape wound around a single reel accommodated in a case, and that is pulled out from an opening formed in the case by a pull out member of a drive device, wherein
   the leader member is manufactured by die casting with one of a zinc alloy, an aluminum alloy, a magnesium alloy, or a copper alloy,
   the leader member is a leader pin including a body on which the free end of the recording tape is wound, and
   a dimension of at least a portion corresponding to a parting line in an axial direction of the body is reduced such that a substantially planar portion is formed at the portion corresponding to the parting line on the body of the leader pin, the substantially planar portion including two substantially planar surfaces formed on an outer circumferential surface of the body of the leader pin such that the two substantially planar surfaces are opposed to each other.

2. The leader member in a recording tape cartridge of claim 1, wherein: the leader member is a leader pin that has head portions on both ends thereof, and a notch portion is formed in at least one of the head portions, the notch portion being configured such that a gate mark, which is formed at the at least one of the head portions when the leader pin is manufactured, does not protrude further than a top surface of the at least one of the head portions.

3. The leader member in a recording tape cartridge of claim 1, wherein a surface of the leader member is subjected to nickel plating working or hard chrome plating working.

4. The leader member in a recording tape cartridge of claim 1, wherein a surface of the leader member is subjected to one of nickel plating working, chrome plating working or chromate treatment.

5. The leader member in a recording tape cartridge of claim 1, wherein: the leader member is a leader pin that has head portions on both ends thereof, and a notch portion is formed in the head portion, the notch portion being configured such that a mark of a pushed portion which is to be pushed by a pushing member, the mark being formed at the head portion when the leader pin is manufactured, does not protrude further than a top surface of the head portion.

6. The leader member of claim 1, wherein the body has a substantially cylindrical shape.

7. A recording tape cartridge, comprising: a single reel around which a recording tape is wound; a case that rotatably accommodates the reel; and a leader member that is attached to a free end of the recording tape, and that is pulled out from an opening formed in the case by a pull out member of a drive device, wherein the leader member is manufactured by die casting with one of a zinc alloy, an aluminum alloy, a magnesium alloy, or a copper alloy, wherein the leader member is a leader pin including a body on which the free end of the recording tape is wound, and a dimension of at least a portion corresponding to a parting line in an axial direction of the body is reduced such that a substantially planar portion is formed at the portion corresponding to the parting line on the body of the leader pin, the substantially planar portion including two substantially planar surfaces formed on an outer circumferential surface of the body of the leader pin such that the two substantially planar surfaces are opposed to each other.

8. The recording tape cartridge of claim 7, wherein the body has a substantially cylindrical shape.

* * * * *